United States Patent [19]

Tollefson et al.

[11] Patent Number: 5,074,451
[45] Date of Patent: Dec. 24, 1991

[54] PLASTIC TAPE GUIDE FOR VIDEOCASSETTE

[75] Inventors: Dale T. Tollefson; David C. Behr; Bruce L. Nelson, all of St. Paul, Minn.

[73] Assignee: Minnesota Mining and Manufacturing Company, St. Paul, Minn.

[21] Appl. No.: 453,720

[22] Filed: Dec. 20, 1989

[51] Int. Cl.⁵ ...................... B65H 23/04; B65H 27/00
[52] U.S. Cl. .................................... 226/196; 242/199; 242/76
[58] Field of Search ................ 242/76, 197, 198, 199; 226/196, 197, 198; 360/132

[56] References Cited

U.S. PATENT DOCUMENTS

| | | | |
|---|---|---|---|
| 3,889,900 | 6/1975 | Nelson | 242/199 |
| 3,910,692 | 10/1975 | Scibilia | 242/199 X |
| 4,168,043 | 9/1979 | Shiba | 242/199 |
| 4,427,166 | 1/1984 | Oishi et al. | 242/199 |
| 4,429,823 | 2/1984 | Umehara | 226/196 |
| 4,620,255 | 10/1986 | Cook et al. | 360/132 |
| 4,635,877 | 1/1987 | Oishi et al. | 242/197 |
| 4,736,904 | 4/1988 | Schoettle et al. | 242/199 |
| 4,745,508 | 5/1988 | Tollefson | 360/130.21 |
| 4,770,367 | 9/1988 | Carroll | 242/199 |
| 4,999,356 | 4/1990 | Nakagawa | 242/199 |

FOREIGN PATENT DOCUMENTS

| | | |
|---|---|---|
| 0342622 | 11/1989 | European Pat. Off. |
| 3134894A | 8/1982 | Fed. Rep. of Germany |
| 3201444A1 | 8/1982 | Fed. Rep. of Germany |
| 60-28063 | 2/1985 | Japan |
| 61-129783 | 6/1986 | Japan |

OTHER PUBLICATIONS

Hoechst Celanese Preliminary Data Sheet for Celcon EF-25 (1988).
Ambur et al., Machine Design, pp. 91-95 (Apr. 20, 1989).
Bernhardt, *Processing of Thermoplastic Materials*, p. 348 (1959).
Cloud et al., Plastics Technology, vol. 24, No. 12, pp. H2-1 to H2-7 (Nov. 1978) (Corresponding to pp. 107-113).

*Primary Examiner*—Daniel P. Stodola
*Assistant Examiner*—P. Bowen
*Attorney, Agent, or Firm*—Gary L. Griswold; Walter N. Kirn; David B. Kagan

[57] ABSTRACT

A tape guide having improved durability and excellent tape tracking characteristics. In one aspect, the present invention concerns a tape guide that comprises a durable, polymeric, resiliently expandable, substantially cylindrical sleeve. An outer tape guiding surface on said sleeve is concave for biasing a magnetic recording tape toward a centered position on the outer tape guiding surface. An inner surface on the sleeve defines a central bore that is smaller in size than the tape guide post. The central bore, though, is of a sufficient size such that the tape guide can be resiliently expanded to fit over a tape guide post with a resilient, gripping effect. A thickened wall portion is circumferentially positioned on the inner surface in a centered position between the top end and the bottom end of the sleeve. In a preferred embodiment, the sleeve has two opposing slot edges that define a slot along the axial direction of the sleeve. The slot edges are biased towards each other. The preferred tape guide also comprises a center gate that is located on the sleeve in a centered position between the top end and the bottom end of the sleeve.

17 Claims, 2 Drawing Sheets

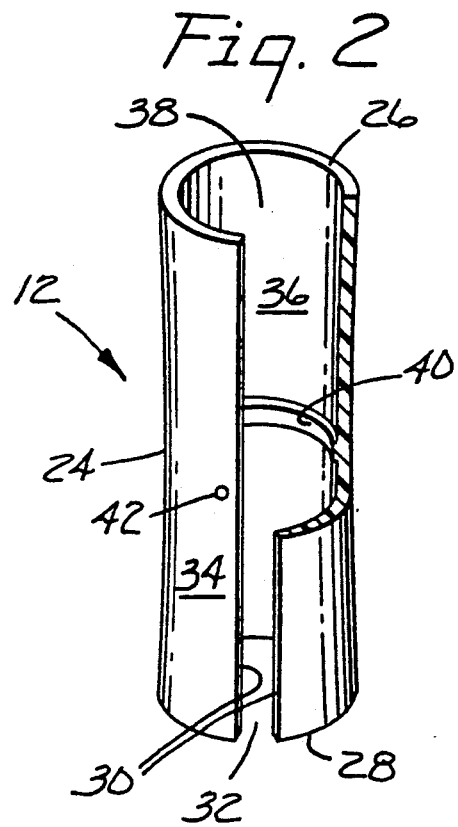
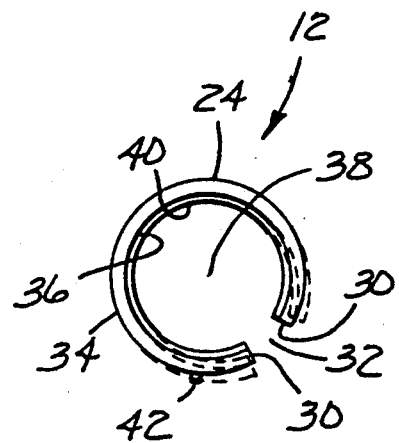
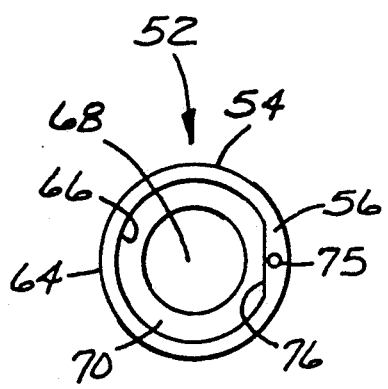
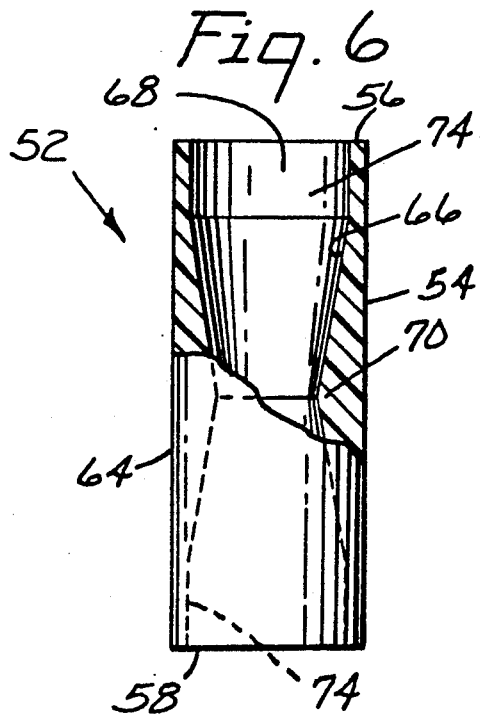

5,074,451

PLASTIC TAPE GUIDE FOR VIDEOCASSETTE

FIELD OF THE INVENTION

The present invention concerns tape guides for magnetic recording tape cassettes. More specifically, the present invention concerns an improved polymeric tape guide for such cassettes.

BACKGROUND OF THE INVENTION

Tape guides are used in a magnetic recording tape cassette for guiding a magnetic recording tape along a predetermined path in the cassette. As a magnetic recording tape is guided across the surface of a tape guide, any irregularities in tape tracking will adversely effect recording and reproducing of magnetically recorded signals. Thus, the quality of magnetically recorded signals depends upon precise, accurate tracking of the tape across a tape guide. Tracking is particularly troublesome for tapes having relatively rough back-coats. Many varieties of tape guides are known in the art.

Metal tape guides comprising a cylindrical sleeve having a slit in the axial direction are disclosed in Umehara U.S. Pat. No. 4,429,823 and Shiba U.S. Pat. No. 4,168,043. A polymeric guide in which the polymer is an acetal copolymer is disclosed in Tollefson U.S. Pat. No. 4,745,508. Carbon fiber filled acetal tape guides are disclosed in the Japanese publication JP60-28063.

Tape guides whose surfaces are relatively rough-textured are disclosed in Umehara U.S. Patent No. 4,429,823, Schoettle U.S. Pat. No. 4,276,575, Smetana U.S. Pat. No. 4,390,119, and Oishi U.S. Pat. No. 4,427,166. Tape guides with concave guiding surfaces are disclosed in Nelson U.S. Pat. No. 3,889,900.

Tape guides are mounted over a tape guide post in an assembled cassette. Typically, tape cassettes, including the tape guide posts, are made from polymeric resins. In the case of metal tape guides, the sharp edge on such guides skives off plastic shavings from the tape guide post as the guide is slid over the post for mounting. This debris can collect on the tape and cause dropouts during recording or playback. Metal tape guides, and particularly stainless steel tape guides, are also much more expensive than polymeric tape guides. As for polymeric tape guides, there continues to be a need for more durable polymeric tape guides that exhibit excellent tracking and tape guiding characteristics.

SUMMARY OF THE INVENTION

The present invention provides a tape guide with improved durability and excellent tape tracking characteristics. The present invention is particularly well-suited for guiding tapes having relatively rough back-coats.

In one aspect, the tape guide of the present invention comprises a durable, polymeric, resiliently expandable, substantially cylindrical sleeve having a top end and a bottom end. An outer tape guiding surface on the sleeve is concave for biasing a magnetic recording tape toward a centered position on the outer tape guiding surface. An inner surface on the sleeve defines a central bore that is smaller in size than the tape guide post. The central bore, though, is of a sufficient size such that the tape guide can be resiliently expanded to fit over a tape guide post with a resilient, gripping effect. A thickened wall portion is circumferentially positioned on the inner surface in a centered position between the top end and the bottom end of the sleeve.

In a preferred embodiment, the sleeve has two opposing slot edges that define a slot along the axial direction of the sleeve. The slot edges are biased towards each other. The preferred tape guide also comprises a center gate that is located on the sleeve in a centered position between the top end and the bottom end of the sleeve.

In another aspect, the present invention concerns a method for making an improved tape guide for use in magnetic recording tape cassettes. The method comprises the step of injection molding the tape guide described above using a center gate.

The resilient characteristic of the tape guide according to the present invention refers to an internal spring retention effect. As a result of this effect, the tape guide will firmly grip a tape guide post to achieve a secure friction fit for mounting of the guide on a tape guide post.

BRIEF DESCRIPTION OF THE DRAWINGS

FIG. 2 is an enlarged perspective view of a tape guide of the present invention with parts thereof broken away and shown in section.

FIG. 3 is a top view of the tape guide shown in FIG. 2.

FIG. 6 is a side elevation of an alternative embodiment of a tape guide of the present invention with parts thereof broken away and shown in section.

FIG. 7 is a top view of the tape guide shown in FIG. 6.

DESCRIPTION OF THE PREFERRED EMBODIMENTS

Figure 1:
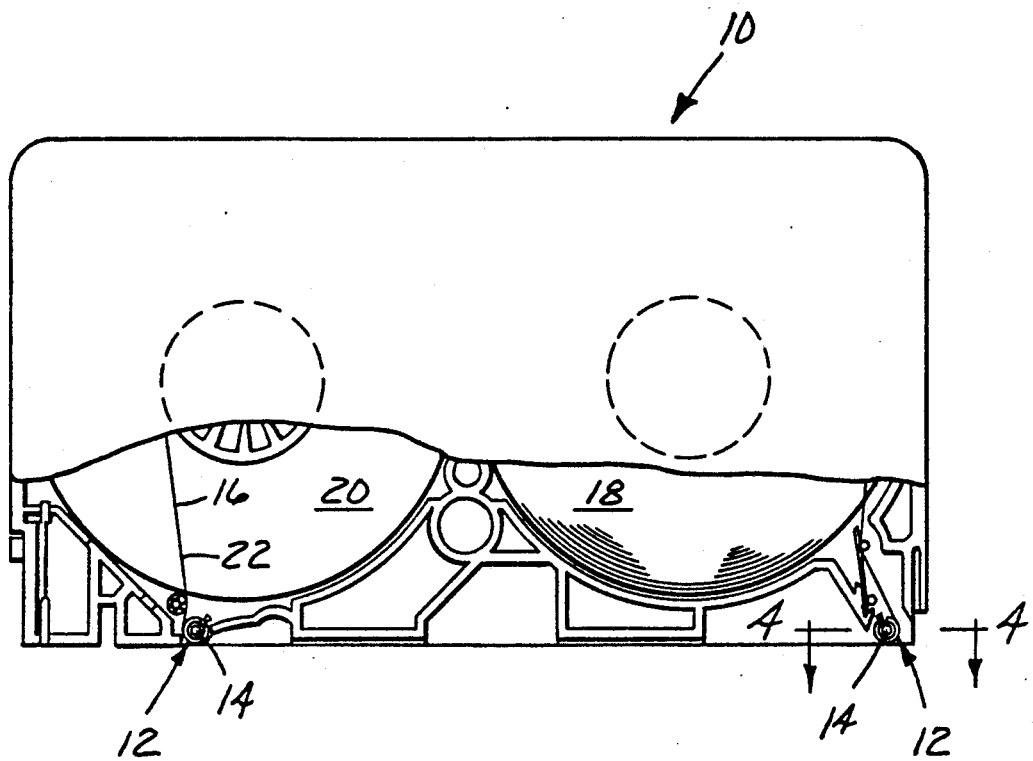
FIG. 1 is a plan view of a magnetic tape cassette with parts thereof broken away that shows the tape path and the position of tape guides of the present invention.

Referring first to FIG. 1, there is shown a video magnetic recording tape cassette 10 including the improved tape guides 12 according to the present invention. Tape guides 12 are nonrotatably mounted on tape guide posts 14. Magnetic recording tape 16 extends from a supply reel 18 to a take-up reel 20. The backside 22 of the magnetic recording tape 16 slideably contacts the tape guides 12 in two possible directions. During recording, playback, or fast forward, the backside 22 of the magnetic recording tape 16 slideably contacts tape guides 12 from right to left in FIG. 1. During rewinding, the backside 22 of the magnetic recording tape 16 slideably contacts the tape guides 12 from left to right. The tape 16 may travel over the tape guides 12 at a relatively low speed during recording or playback (1.31 in/sec; 3.33 cm/s) or at relatively high speed during fast forward or rewind (38.4 in/sec; 97.5 cm/s) for a T-120 cassette in the two-hour mode. The tape 16 is under tension at all times.

It is not essential that the present invention be used solely in a cassette such as the magnetic recording cassette 10 of FIG. 1. Rather, the present invention also can be used with various types of magnetic recording tape cassettes that require tape guides.

Tape guides 12 are each mounted in an identical manner in the cassette 10 and for purposes of clarity and brevity, only one of the tape guides 12 will be described herein.

Referring now to FIG. 2 there is shown a preferred embodiment of a tape guide 12 according to the present invention. The tape guide 12 comprises a polymeric, resiliently expandable, substantially cylindrical sleeve 24. The sleeve 24 has two opposing slot edges 30 that define a slot 32 along the axial direction of the sleeve 24. Slot edges 30 may be abutting or nonabutting. If the slot edges 30 are nonabutting, as shown in FIG. 2, preferably, the distance between slot edges 30 is no more than 60° of an arc as measured around the circumference of tape guide 12. When assembled into a magnetic tape cassette, the slot 32 is disposed to a position on the tape guide post 14 such that the magnetic recording tape does not touch the slot 32 as the tape 16 slideably contacts the tape guide 12.

The structure of the preferred tape guide 12 is particularly useful in that provision of the slot 32 in the sleeve 24 results in a tape guide requiring less material to manufacture than prior art polymeric tape guides. Further, the slot 32 allows the tape guide 12 to be pre-oriented in a feeder bowl for mating with a keyed boss for easy orientation of the tape guide 12 on a tape guide post during assembly of a magnetic recording tape cassette. This permits two assembly stations to be eliminated from a typical assembly line, namely orientation and probe stations. Hence, the invention provides important economies compared to the known metal or polymeric tape guides.

As another advantage, use of a tape guide having a slot 32 in the axial direction provides a tape guide 12 that is sufficiently resilient for easy mounting of the tape guide 12 on a tape guide post, even when the tape guide 12 is made with a durable resin, such as Celcon EF-25, a carbon fiber filled polyacetal resin sold by Engineering Plastics Division, Hoechst Celanes Corporation. Because the tape guide 12 is so readily expandable for easy mounting on a tape guide post, there is no need to observe such strict manufacturing tolerances when injection molding the inventive tape guide as would be necessary when molding concave polymeric tape guides of the prior art. Furthermore, because the tape guide 12 can be expanded for easy placement around a tape guide post, the tape guide 12 achieves a secure friction fit without skiving material from the guide post, thus avoiding the undesirable debris associated with stainless steel or other metal tape guides which must be slid onto a post without expansion.

In order to achieve the advantages of the present invention, the tape guide 12 has a composition comprising a polymeric resin characterized by low friction, high melting point, and good durability. The polymeric resin should also be a relatively stiff, resilient material having a spring retention effect sufficient for gripping a tape guide post. Preferred materials are polymeric resins which melt at temperatures between 80° C. and 300° C. without decomposition. The tape guide 12 may also comprise mixtures of such resins. A polyacetal resin is most preferred. Polyacetal resins are described in U.S. Pat. Nos. 3,027,352; 3,318,848; and 3,418,280. The use of polyacetal resins for tape guiding surfaces is described in Tollefson U.S. Pat. No. 4,745,508.

Particularly advantageous results can be obtained by using a polyacetal resin filled with carbon fibers. An example of particularly preferred carbon fiber filled polyacetal resin is sold by Engineering Plastics Division, Hoechst Celanese Corporation, under the trade designation Celcon EF-25. Carbon fiber filled acetal tape guides are also described in the Japanese publication JP60-28063, incorporated herein by reference.

The weight percent of carbon fiber in the resin may vary depending on the physical dimension of the fibers, the chemical nature, e.g., viscosity, of the resin, and the end use for the product. Generally, the composition of the tape guide 12 comprises from about 5 percent to 30 percent by weight of carbon fiber. Preferably, the carbon fiber is present in an amount of from about 10 percent to 20 percent by weight. Most preferably, the carbon fiber is present in an amount of about 20 percent by weight. If less than about 5 percent by weight of carbon fiber is used, then the amount of carbon fiber may not be sufficient to provide an adequate thermal, electrical, or structural impact. On the other hand, if more than about 30 percent by weight of carbon fiber is used, then the outer tape guiding surface may be too rough, causing excessive backside wear of the magnetic recording tape.

In order to provide a suitable amount of friction between tape guide 12 and the backside 22 of a magnetic recording tape 16, the surface roughness of the outer tape guiding surface 34 should be no more than about 74 microinches (1.9 micrometers) (Ra). Preferably, the surface roughness of the outer tape guiding surface 34 is no more than about 18 microinches (0.5 micrometers) (Ra). If the microscopic surface of the outer tape guiding surface 34 is more than about 74 microinches (1.9 micrometers) (Ra), then the backside 22 of the magnetic recording tape 16 running across the guide 12 may experience excessive backside wear and tape tension. The degree of surface roughness can be controlled by varying the amount of carbon fiber in the composition of the inventive tape guide. Increasing the amount of carbon fiber results in greater surface roughness.

It is also preferable that the tape guide 12 has a surface resistivity of $10^2$ to $10^3$ ohm-cm. The surface resistivity can be controlled by varying the amount of carbon fiber. Increasing the amount of carbon fiber will lower the surface resistivity of the guide.

Referring again to FIG. 2, outer tape guiding surface 34 is concave for biasing a magnetic recording tape 16 toward a centered position on guide 12 when the tape 16 slideably contacts the outer tape guiding surface 34. The concave outer tape guiding surface 34 develops tape centering forces to maintain the tape in an optimum tracking position. This bias naturally results from the tape path being shortest at the center of the tape guide 12 and from the tendency of the tape 16 to minimize tape tension by traveling along the shortest path. This performance is attained even when the surface of the tape guide 12 is quite rough, e.g., 28 to 74 microinches, or 0.71 to 1.9 micrometers, (Ra). Since that or less surface roughness can be readily obtained by conventional injection molding, there is no need to machine the molded tape guides or to take any special precautions in making molds.

Inner surface 36 defines a central bore 38. The central bore 38 is smaller in size than the tape guide post upon which tape guide 12 is to be mounted. The tape guide 12 can be resiliently expanded by moving slot edges 30 away from each other, thereby increasing the size of the central bore 38 by an amount sufficient to fit tape guide 12 onto the tape guide post.

Thickened wall portion 40 is circumferentially positioned on inner surface 36 in a centered position between top end 26 and bottom end 28 of sleeve 24. Thickened wall portion 40 causes outer tape guiding surface 34 to be concave as tape guide 12 cools after injection molding, because thickened wall portion 40 cools more slowly than the rest of the tape guide. Thickened wall portion 40 also provides tape guide 12 with added structural strength. Thickened wall portion 40 further provides means for grabbing tape guide in order to remove tape guide from an injection mold.

The tape guide 12 would have greater strength and resiliency when injection molded with center gate 42, particularly in those instances where the inventive tape guide comprises a carbon fiber filled polyacetal resin having from about 5% to about 30% by weight of carbon fiber. By using a center gate during injection molding, the hot melt flow distributes evenly around the circumference of the tape guide mold. Published studies of the flow of polymeric resins and of fiber filled resins during injection molding suggests that the polymer molecular chains and carbon fibers in the melt will tend to align themselves in the direction of the melt flow. Hence, as the melt flow distributes circumferentially around the mold, the polymer chains and carbon fibers will align themselves in the circumferential direction as well. It is this molecular orientation that is believed to impart improved strength and resiliency to the tape guide of the present invention. This molecular orientation also is aligned in the direction of tape travel, thus tending to reduce the friction and scratching of the tape as the tape is guided by the tape guide. Such orientation would not be observed with the use of an end gate or a tunnel gate for injection molding.

The center gate 42 is advantageously located at a centered position between the top end 26 and bottom end 28 of the sleeve 24 within about 15° of arc from a slot edge 30 as measured around the circumference of the sleeve 24. The center gate 42 may be on the outer tape guiding surface 34, as shown in FIG. 2, or on the inner surface 36. For a shorter tape guide, a single gate or two gates, with one gate being near each slot edge 30, will suffice. With longer tape guides, additional center gates 42 along the length of the guide may be required in order to achieve a circumferential orientation of the polymeric molecular chains and the carbon fibers.

The resilient, expandable characteristics of the tape guide 12 is best seen in FIG. 3. The solid lines in FIG. 3 show the tape guide 12 in its normal state in which the size of the central bore 38 is smaller than the tape guide post upon which the guide 12 is to be mounted. The dashed lines in FIG. 3 show a tape guide 12 in which slot edges 30 have resiliently moved away from each other under an external force. The resilient characteristic of the tape guide 12 is such that once the external force is removed from the tape guide 12, the tape guide will return to its original size and shape as shown by the solid lines. If a tape guide post is interposed into the central bore 38 while the tape guide 12 is expanded, then the tape guide 12 will resiliently grip the tape guide post after the external force has been removed.

Figure 4:
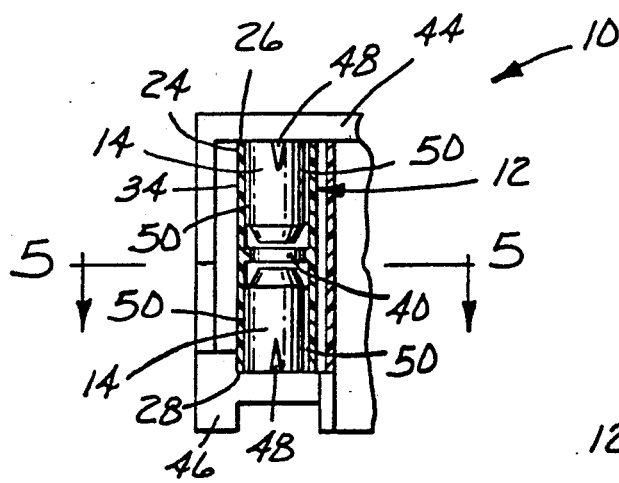
FIG. 4 is an enlarged section view of the cassette of FIG. 1 taken along line 4—4 that shows a tape guide of the present invention mounted on a tape guide post.
Figure 5:
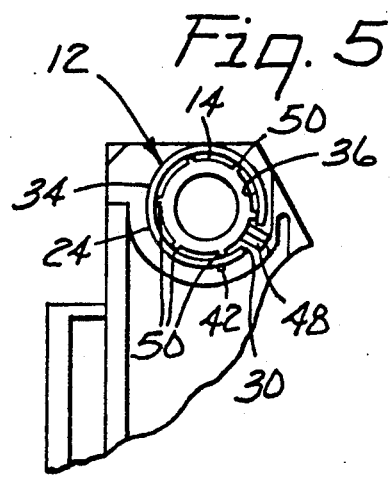
FIG. 5 is a sectional view taken along line 5—5 of FIG. 4 that shows an end view of a tape guide mounted on a tape guide post.

FIG. 4 and FIG. 5 show a fragment of magnetic recording cassette 10 comprising a tape guide 12 according to the present invention. Cassette 10 comprises a top casing 44 and a bottom casing 46, between which tape guide 12 has been mounted over tape guide posts 14. Each end of the posts 14 has been chamfered for easy insertion of tape guide 12 onto the posts 14. FIGS. 4 and 5 show optional triangular projections 48 positioned at the base of each post 14. Triangular projections 48 fit within slot 32 when tape guide 12 is mounted over the posts 14. Triangular projections 48 help prevent movement, such as rotational movement, of the tape guide 12 about posts 14 when a magnetic recording tape (not shown in FIGS. 4 and 5) slideably contacts tape guide 12. FIGS. 4 and 5 also show optional supporting members 50 longitudinally positioned around posts 14. Supporting members 50 also help prevent movement, such as back and forth movement or wobbling, of tape guide 12 on posts 14 when a magnetic recording tape slideably contacts the tape guide 12.

FIG. 6 and FIG. 7 show a second embodiment of the present invention. Similar to tape guide 12 shown in FIGS. 2 through 5, tape guide 52 comprises a polymeric, resiliently expandable, substantially cylindrical sleeve 4 having a top end 56 and a bottom end 58. Outer tape guiding surface 64 is concave for biasing a magnetic recording tape toward a centered position on the guide 52. Inner surface 66 defines a central bore 68. Central bore 68 is smaller in size than the tape guide post upon which the tape guide 52 is to be mounted, but the central bore 68 is of a size such that tape guide 52 can be resiliently expanded to fit over a tape guide post with a resilient, gripping effect. Thickened wall portion 70 is circumferentially positioned on inner surface 66 in a centered position between top end 56 and bottom end 58 of sleeve 54.

As seen best in FIG. 6, preferably a step 74 is provided on inner surface 66 at the top end 56 and bottom end 58 of sleeve 54. Step 74 is parallel to outer tape guiding surface 64 and provides a flat mounting surface for placement of tape guide 52 on the tape guide post.

As seen best in FIG. 7, step 74 may optionally have a flattened sidewall 76. Then, when guide 52 is fitted over a substantially cylindrical tape guide post, guide 52 is distorted and thus assumes a slightly oval shape that prevents guide 52 from rotating about the tape guide post. Flattened sidewall 76 also provides sufficient space for end gate 75 to be located at top end 56 of tape guide 52. Alternatively, end gate 75 and flattened sidewall 76 can also be positioned at bottom end 58. When using end gate 75, there is no need to orient the gate 75 away from a tape which is guided by tape guide 52.

The invention will be further described by reference to the following Example.

EXAMPLE

Using a one-piece injection mold, the tape guide shown in FIG. 2 was molded with a center gate using CELCON EF-25, a polyacetal resin loaded with 20% by weight of carbon fiber and sold by Engineering Plastics Division, Hoechst Celanese Corporation, Chatham, N.J. 07928. The carbon fibers were about 0.07 mm in diameter and about 6.0 mm in length prior to processing. The resin was dried at 180° F. (82° C.) for 3 hours before molding began. For molding, a profilometer sold by Bendix Corporation, Dayton, Ohio was used. The profilometer had an amplifier designated as Type QEH Model 6 and a pilotor designated as Type ADG Model 1. The molding machine was an 85 ton HT Series machine sold by Van Dorn Plastic Machine Company, Strongsville, Ohio. The machine settings are summarized in Table I:

TABLE I

| Machine Settings | | |
|---|---|---|
| temperature, rear zone | 420° F. | (216° C.) |
| temperature, front zone | 420° F. | (216° C.) |

TABLE I-continued

Machine Settings

| | | |
|---|---|---|
| nozzle temperature | 410° F. | (210° C.) |
| injection pressure | 1500 psi | (10.3 MPa) |
| holding pressure | 850 psi | (5.9 MPa) |
| back pressure | 25 psi | (.17 MPa) |
| injection speed | full | |
| screw speed | full | |
| injection time | 3.2 seconds | |
| holding pressure time | 2.5 seconds | |
| injection dose | 2.0 inches | (5.1 cm) |
| suck back | 4 inches/min. | (.2 cm/s) |
| clamp close (cooling) | 4.0 seconds | |
| clamp open | 1.3 seconds | |
| close speed | medium | |
| open speed | medium | |
| ejector speed, forward | medium | |
| ejector speed, retract | medium | |
| mold temperature, cavity side | 240° F. | (116° C.) |
| mold temperature, force side | 240° F. | (116° C.) |
| overall cycle time | 10.9 seconds | |
| screw ratio | 3:1 | |

The resin was liquified at 420° F. (216° C.) under 1500 psi (10. MPa) and injected into the mold cavity. The resin was allowed to cool in the mold, after which the resulting tape guide was ejected from the mold. A sink, or concave feature, developed around the center circumference of the guide such that the diameters around the center circumference of the guide were 0.004 inches (0.01 cm) to 0.008 inches (0.02 cm) smaller than the diameters at the top end or bottom end of the tape guide. The thickened wall portion on the inner surface was a ridge about 0.008 inches (0.02 cm) high by about 0.043 inches (0.11 cm) wide. The surface roughness of the guide was from about 12 microinches (0.3 micrometers) to about 18 microinches 0.5 micrometers) (Ra). The surface resistivity of the guide was about $10^3$ ohm-cm.

Other embodiments of this invention will be apparent to those skilled in the art from a consideration of this specification or from practice of the invention disclosed herein. Various omissions, modifications, and changes to the principles described herein may be made by one skilled in the art without departing from the true scope and spirit from the invention which is indicated by the following claims.

What is claimed is:

1. A tape guide for mounting on a tape guide post and for guiding a magnetic recording tape, comprising:
   (a) a polymeric, resiliently expandable, substantially cylindrical sleeve having a top end and a bottom end;
   (b) a concave, outer tape guiding surface on the sleeve for biasing a magnetic recording tape toward a centered position on the outer tape guiding surface;
   (c) an inner surface on the sleeve defining a central bore, wherein the central bore is smaller in size than the tape guide post upon which the tape guide is to be mounted, and wherein the central bore is of a sufficient size such that the tape guide can be resiliently expanded to fit over the tape guide post with a resilient gripping effect; and
   (d) a thickened wall portion circumferentially positioned on the inner surface in a centered position between the top end and the bottom end of the sleeve.

2. A tape guide as recited in claim 1, further comprising:
   (a) a pair of slot edges that define a slot along the axial direction of the sleeve, wherein the slot edges are biased toward each other; and
   (b) a center gate, wherein the center gate is on the sleeve in a centered position between the top end and the bottom end of the sleeve.

3. A tape guide as recited in claim 2, wherein the center gate is located within about 15 degrees of arc from a slot edge as measured around the circumference of the sleeve.

4. A tape guide as recited in claim 2, wherein the composition of the tape guide comprises a polyacetal resin.

5. A tape guide as recited in claim 2, further comprising from about 5 to about 30 percent by weight of carbon fiber.

6. A tape guide as recited in claim 2, wherein the tape guide comprises from about 10% to about 20% by weight of carbon fiber.

7. A tape guide as recited in claim 2, wherein the tape guide comprises about 20% by weight of carbon fiber.

8. A tape guide as recited in claim 2, wherein the surface roughness of the outer tape guiding surface is no more than about 1.9 mcirometers (Ra).

9. A tape guide as recited in claim 2, wherein the surface roughness of the outer tape guiding surface is no more than about 0.05 micrometers (Ra).

10. A tape guide as recited in claim 2, wherein the surface resistivity of the outer tape guiding surface is from about $10^2$ ohm-cm to about $10^3$ ohm-cm.

11. A tape guide as recited in claim 1, wherein the composition of the tape guide comprises a polyacetal resin.

12. A tape guide as recited in claim 1, further comprising from about 5 to about 30 percent by weight of carbon fiber.

13. A tape guide as recited in claim 1, wherein the tape guide comprsies from about 10% to about 20% by weight of carbon fiber.

14. A tape guide as recited in claim 1, wherein the tape guide comprises about 20% by weight of carbon fiber.

15. A tape guide as recited in claim 1, wherein the surface roughness of the outer tape guiding surface is no more than about 1.9 micrometers (Ra).

16. A tape guide as recited in claim 1, wherein he surface roughness of the outer tape guiding surface is no more than about 0.5 micrometers (Ra).

17. A tape guide as recited in claim 1, wherein the surface resistivity of the outer tape guiding surface is from about $10^2$ ohm-cm to about $10^3$ ohm-cm.

* * * * *

UNITED STATES PATENT AND TRADEMARK OFFICE
CERTIFICATE OF CORRECTION

PATENT NO. : 5,074,451

DATED : December 24, 1991

INVENTOR(S) : Tollefson et al.

It is certified that error appears in the above-identified patent and that said Letters Patent is hereby corrected as shown below:

Col. 3, line 39, "Celanes" should be --Celanese--.
Col. 6, line 16, "4" should be --54--.
Col. 7, line 23, "(10. MPa)" should be --(10.3 MPa)--.
Col. 8, line 35, "0.05" should be --.5--.
Col. 8, line 46, "comprsies" should be --comprises--.
Col. 8, line 54, "he" should be --the--.

Signed and Sealed this

Eighth Day of June, 1993

Attest:

MICHAEL K. KIRK

*Attesting Officer*      *Acting Commissioner of Patents and Trademarks*